(12) United States Patent
Dudash et al.

(10) Patent No.: US 7,909,407 B2
(45) Date of Patent: Mar. 22, 2011

(54) VEHICLE SEAT CONNECTION

(75) Inventors: Eugene S. Dudash, Wixom, MI (US);
Don Bernhardt, Walled Lake, MI (US);
Jeff Frelich, Commerce, MI (US);
Raymond E. Scott, Troy, MI (US)

(73) Assignee: Lear Corporation, Southfield, MI (US)

( * ) Notice: Subject to any disclaimer, the term of this patent is extended or adjusted under 35 U.S.C. 154(b) by 416 days.

(21) Appl. No.: 11/759,519

(22) Filed: Jun. 7, 2007

(65) Prior Publication Data

US 2008/0303332 A1 Dec. 11, 2008

(51) Int. Cl.
*B60N 2/30* (2006.01)

(52) U.S. Cl. ........... 297/440.15; 297/440.16; 297/440.2; 297/440.21; 297/378.1; 297/378.12

(58) Field of Classification Search ............. 297/440.15, 297/440.16, 440.2, 440.21, 378.12, 378.1, 297/378.13, 378.14
See application file for complete search history.

(56) References Cited

U.S. PATENT DOCUMENTS

| | | | | |
|---|---|---|---|---|
| 3,525,549 A | * | 8/1970 | Knabusch et al. | 297/440.21 |
| 4,061,371 A | * | 12/1977 | Prather et al. | 292/198 |
| 4,386,805 A | * | 6/1983 | Boisset | 297/440.21 X |
| 4,850,646 A | | 7/1989 | Wieland | |
| 4,881,776 A | * | 11/1989 | Wang | 297/440.21 X |
| 4,890,888 A | * | 1/1990 | Kostin | 297/440.21 |
| 5,005,908 A | * | 4/1991 | Young | 297/440.21 |
| 5,135,284 A | * | 8/1992 | Crum | 297/440.15 |
| 5,156,442 A | * | 10/1992 | Courtois | 297/440.15 |
| 5,169,211 A | * | 12/1992 | Inaba et al. | 297/440.16 |
| 5,184,871 A | * | 2/1993 | LaPointe et al. | 297/440.21 |
| 5,253,923 A | * | 10/1993 | Gootee | 297/440.21 |
| 5,269,589 A | * | 12/1993 | Brothers et al. | 297/440.16 |
| 5,462,332 A | * | 10/1995 | Payne et al. | 297/216.1 |
| 5,645,318 A | | 7/1997 | Allison | |
| 5,685,614 A | * | 11/1997 | Chabanne | 297/452.2 |
| 5,690,386 A | * | 11/1997 | Chabanne | 297/452.2 X |
| 5,707,112 A | * | 1/1998 | Zinn | 297/378.14 |
| 5,711,577 A | * | 1/1998 | Whalen | 297/440.21 X |
| 5,716,100 A | * | 2/1998 | Lang | 297/452.2 X |
| 5,791,738 A | * | 8/1998 | Niezoldt | 297/452.2 X |
| 5,795,024 A | * | 8/1998 | Collins et al. | 297/440.21 X |
| 5,826,944 A | * | 10/1998 | Beneker et al. | 297/440.2 |
| 5,895,096 A | | 4/1999 | Massara | |

(Continued)

OTHER PUBLICATIONS

German Office Action for corresponding Application No. 10 2008 020 156.1, mailed Apr. 22, 2010, 7 pages.

(Continued)

*Primary Examiner* — Rodney B White
(74) *Attorney, Agent, or Firm* — Brooks Kushman P.C.

(57) ABSTRACT

A vehicle seat comprises a seat bottom with a frame with a slot or a pivotal connection. A seat back has a frame with the other of the slot and the pivotal connection to cooperate with the seat back for collapsing the seat back upon the seat bottom. A receiver is mounted to one of the seat bottom or the seat back with a first locking component and an insert is mounted to the other with a second locking component. The seat back is assembled to the seat bottom by pivoting the seat back to align the receiver and insert and translating the seat back along the slot until the insert is inserted into the receiver and the locking components are locked. The vehicle seat connection permits the seat bottom and seat back to be fabricated at separate facilities and then shipped to an assembly facility.

20 Claims, 3 Drawing Sheets

U.S. PATENT DOCUMENTS

| | | | |
|---|---|---|---|
| 5,918,943 A * | 7/1999 | Mitschelen et al. | ... 297/440.2 X |
| RE37,026 E * | 1/2001 | Whalen | ............... 297/440.21 X |
| 6,170,898 B1 * | 1/2001 | Cunningham et al. | .................... 297/452.18 X |
| 6,322,148 B1 * | 11/2001 | Kolena et al. | .............. 297/452.2 |
| 6,488,339 B1 | 12/2002 | Finner et al. | |
| 6,543,855 B2 * | 4/2003 | Bruck | ................. 297/440.16 X |
| 6,685,272 B1 * | 2/2004 | Bonk et al. | ........... 297/440.21 X |
| 6,698,840 B1 | 3/2004 | Tseng | |
| 6,761,412 B1 | 7/2004 | Garnweidner et al. | |
| 7,055,902 B2 * | 6/2006 | Matsushita | .......... 297/440.15 X |
| 7,066,552 B2 * | 6/2006 | Yoshida | ................... 297/452.18 |
| 7,399,036 B2 * | 7/2008 | Kowal et al. | ............. 297/440.16 |
| 2004/0250347 A1 | 12/2004 | Brewin et al. | |

OTHER PUBLICATIONS

Translation only of China Office Action for corresponding Application No. 2008100980061, mailed Dec. 11, 2009, 6 pages.

* cited by examiner

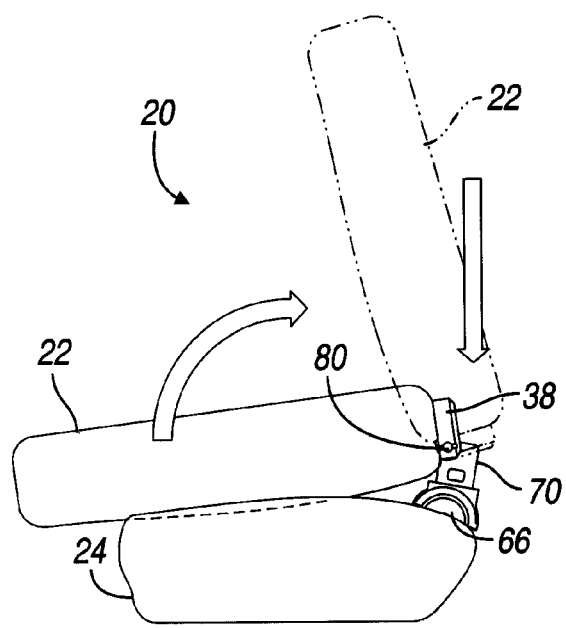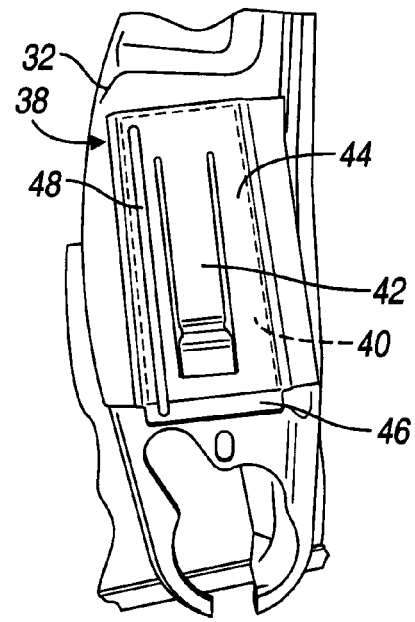
FIG. 1
FIG. 3
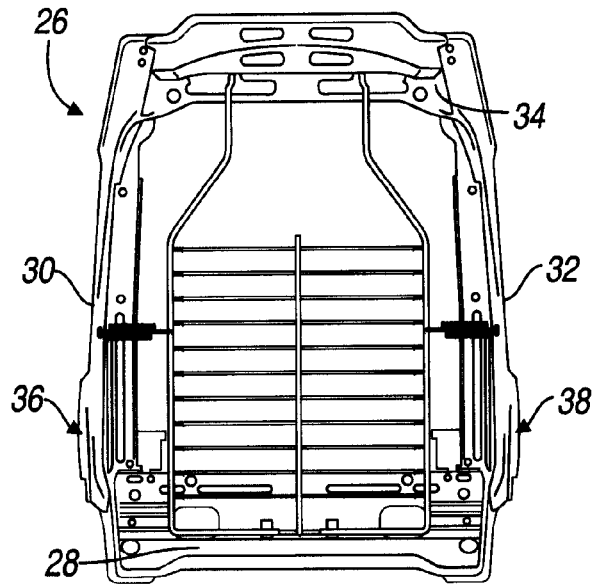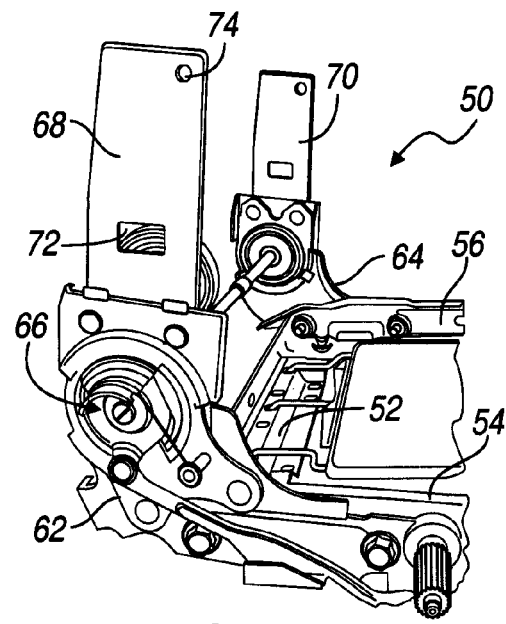
FIG. 2
FIG. 4

VEHICLE SEAT CONNECTION

BACKGROUND OF THE INVENTION

1. Field of the Invention

The invention relates to vehicle seat connections for connecting a seat back to a seat bottom.

2. Background Art

Vehicle seat connections for connecting a seat back to a seat bottom are designed with various criteria including recline adjustment of the seat back, support of the seat back, manufacturing limitations and assembly limitations. A vehicle seat connection assembly is disclosed in U.S. Pat. No. 6,322,148 B1, which issued to Kolena et al. on Nov. 27, 2001.

BRIEF DESCRIPTION OF THE DRAWINGS

FIG. 1 is a side elevation view of a vehicle seat in accordance with the present invention;

FIG. 2 is a front perspective view of a seat back frame in accordance with the present invention;

FIG. 3 is a right side elevation view of a portion of the seat back frame of FIG. 2;

FIG. 4 is a side perspective view of a portion of a seat bottom frame in accordance with the present invention;

DETAILED DESCRIPTION OF EMBODIMENTS OF THE INVENTION

Figure 5:
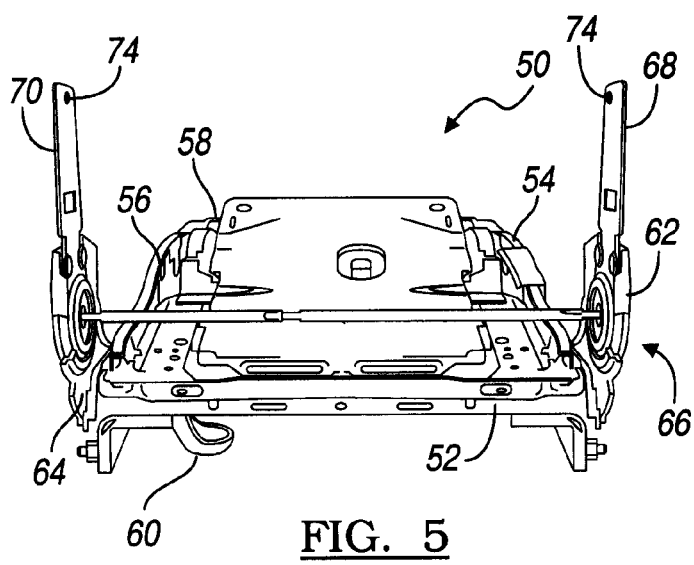
FIG. 5 is a rear perspective view of the seat bottom frame of FIG. 4.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or may be minimized to show details of the particular components. Therefore, specific structural and functional details disclosed herein are not to be interpreted as limiting, but merely as a representative basis of the claims and/or as a representative basis for teaching one skilled in the art to variously employ the present invention.

With reference now to FIG. 1, a vehicle seat is illustrated according to one embodiment of the present invention, and is referenced generally by numeral 20. Vehicle seats, such as vehicle seat 20, are often manufactured at a separate facility, or multiple separate facilities, from that of a vehicle assembly facility. Accordingly, after the vehicle seat is manufactured, the seat then must be shipped to the vehicle assembly facility. Once a vehicle seat, such as vehicle seat 20 is fully assembled, a seat back 22 is connected to a seat bottom 24. Typically, when the seat back 22 is connected to the seat bottom 24, the seat back 22 is limited in adjustment relative to the seat bottom 24 through a range of tilt or recline of the seat back 22 relative to the seat bottom 24. Thus, the most compact orientation of an assembled vehicle seat 20 is a fully forward tilt of the seat back 22 relative to the seat bottom 24 as illustrated in phantom in FIG. 1. In order to minimize shipping costs and limitations, vehicle seat backs 22 are typically not connected to the seat bottom 24 at the facility where the vehicle seat is fabricated. The seat back 22 is conventionally assembled to the seat bottom 24 at a vehicle assembly facility, or at an intermediate facility, such as a just-in-time (JIT) supply or storage facility.

Assembling the seat back 22 to the seat bottom 24 at an intermediate facility, or a vehicle assembly facility may be costly due to the labor and cycle time required. Accordingly, a simplified vehicle seat connection is provided for minimizing labor and cycle time associated with assembling the seat back 22 to the seat bottom 24. Additionally, in at least one embodiment of the invention, a temporary connection is provided between the seat back 22 and the seat bottom 24 to provide a fully collapsed orientation of the vehicle seat 20 as illustrated in FIG. 1, wherein seat support surfaces of the seat back 22 and the seat bottom 24 face each other and contact each other in a collapsed position.

Referring now to FIG. 2, a seat back frame 26 is illustrated without trim and cushioning. The seat back frame 26 is provided generally by a lower cross member 28, a pair of laterally spaced side members 30, 32 extending upright from the lower cross member 28, and an upper cross member 34 extending across the top of the side members 30, 32. The seat back frame 26 includes a pair of receivers 36, 38 each mounted to one of the side members 30, 32 at a lower region of the side members 30, 32.

Referring now to FIG. 3, one of the receivers 38 is illustrated in greater detail. The receiver 38 extends laterally outboard from the side member 32 with a downward facing cavity 40 that is sized for receiving an insert from the seat bottom 24. The cavity 40 is tapered to facilitate alignment of the receiver 38 and the insert, and to provide a surface contact once assembled for minimizing buzz, squeak and rattle. Additionally, the cavity 40 may be lined with a damping material for minimizing buzz, squeak and rattle between the receiver 38 and the insert. The receiver 38 may be formed from stamped sheet metal and may be formed separately or integrally with the side member 32.

The receiver 38 also includes a spring clip 42 formed on an outboard region 44 of the receiver 38. The spring clip 42 functions to lock the receiver 38 to the insert. In at least one embodiment, a tapered flange 46 extends from the receiver 38 to assist in guiding the insert into the receiver 38. In another embodiment, the receiver 38 includes a longitudinal slot 48 formed lengthwise through the receiver 38, such as in the outboard region 44, for providing a temporary connection with the insert as will be discussed below.

Referring now to FIGS. 4 and 5, a seat bottom frame 50 is illustrated with trim and cushioning removed. The seat bottom frame 50 includes a rear cross member 52, a pair of side members 54, 56 extending from the rear cross member 52, and a front cross member 58 extending across the side members 54, 56. The seat bottom frame 50 includes mounting hardware 60 for securing the vehicle seat 20 into a vehicle. The hardware 60 may also include a seat track.

A pair of hinge brackets 62, 64 are each mounted to one of the side members 54, 56 and extend upward from the seat bottom frame 50 to support a hinge assembly 66, which adjusts a tilt and recline angle between the seat back 22 and the seat bottom 24. Hinge assemblies are known in the art and any suitable hinge assembly may be utilized in accordance with the present invention.

The hinge assembly 66 includes a pair of seat brackets 68, 70 that extend upward from the seat bottom frame 50. The seat brackets 68, 70 are each sized to be inserted within the cavity 40 of one of the receivers 36, 38 for supporting the seat back frame 26 relative to the seat bottom frame 50. Each seat bracket 68, 70 is tapered with a width that narrows toward the distal end for guiding the brackets 68, 70 within the receivers 36, 38 and for providing an area of contact within the receivers 36, 38 once assembled. Each seat bracket 68, 70 includes an aperture 72 formed therethrough at a lower end for receiving the spring clip 42 of the associated receiver 36, 38, thereby locking the receiver 36, 38 to the corresponding seat bracket 68, 70.

Each seat bracket 68, 70 may include an aperture 74 formed through the bracket 68, 70 near the distal end of the associated bracket 68, 70 aligned with the slot 48 of the corresponding receiver 36, 38 for providing a temporary pivotal connection between the receivers 36, 38 and the seat brackets 68, 70, as will be discussed below.

Figure 6:
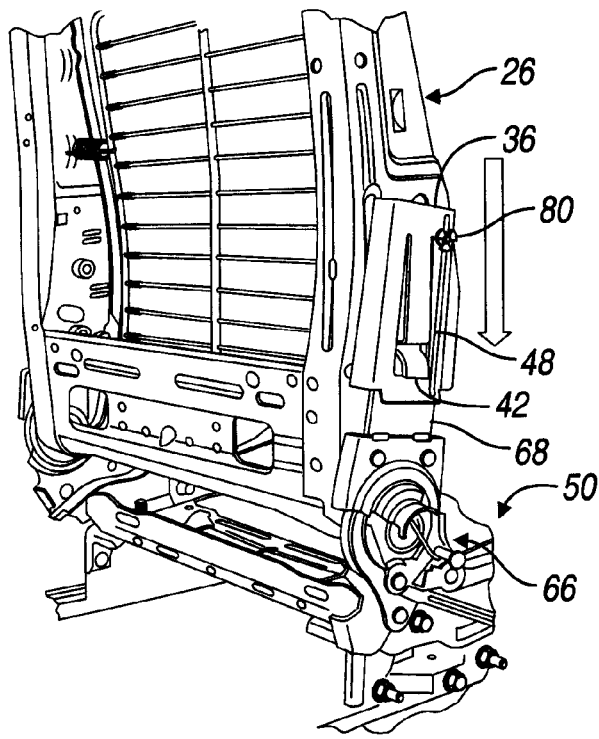
FIG. 6 is rear perspective view illustrating assembly of the seat back frame to the seat bottom frame.
Figure 7:
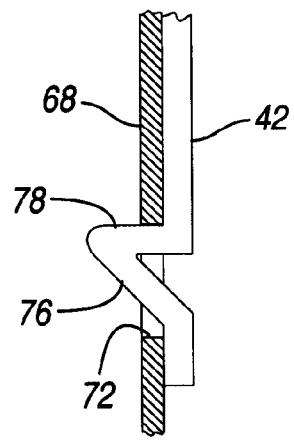
FIG. 7 is a partial section view of a lock mechanism of the vehicle seat frames.

The seat back frame 26 is assembled to the seat bottom frame 50 by aligning the receivers 36, 38 with the seat brackets 68, 70 and translating the seat back frame 26 downward as illustrated in FIG. 6. As the seat back frame 26 is translated downwards, the seat brackets 68, 70 engage the spring clips 42 and urge the spring clips 42 outward until the spring clips 42 engage the apertures 72, thereby locking the receivers 36, 38 to the seat brackets 68, 70. Referring now to FIG. 7, each spring clip 42 has a leading edge 76 for urging the spring clip 42 outward, as illustrated in FIG. 6, upon engagement with the corresponding seat bracket 68. Spring clip 42 also has a retaining edge 78 so that once a peak of the spring clip 42 engages the aperture 72, the peak extends into the aperture 72 with the retaining edge 78 engaged against the aperture 72 to lock the spring clip 42 with the aperture 72.

Figure 8:
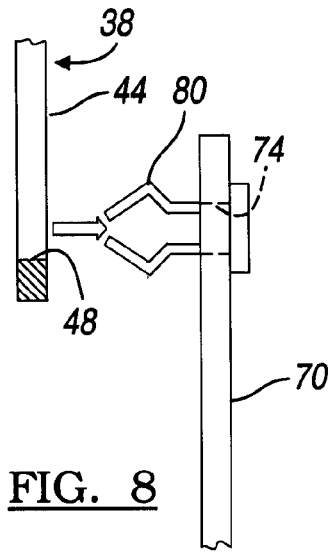
FIG. 8 is a partial section view of a portion of the seat back frame and seat bottom frame during a manufacturing step.

Referring now to FIG. 8, a temporary pivotal connection may be provided between each receiver 36, 38 and the corresponding seat bracket 68, 70. For example, a star clip 80 may be inserted into the aperture 74 of the seat bracket 70. The star clip 80 is then inserted into the slot 48 of the receiver 38 to provide a sliding pivotal connection between the receiver 38 and the seat bracket 70. Referring again to FIG. 1, the sliding pivotal connection permits the seat back 22 to be pivoted to the fully collapsed orientation with respect to the seat bottom 24 due to the temporary pivotal connection. Prior to, or during assembly of the vehicle seat 20 to the vehicle, the seat back 22 may be pivoted about the star clips 80 as illustrated by the arcuate arrow in FIG. 1. Upon reaching a rotational orientation that aligns the receivers 36, 38 with the seat brackets 68, 70, the seat back 22 is then translated linearly as illustrated by the straight arrow in FIG. 1. Referring again to FIG. 6, as the seat back frame 26 slides downward relative to the seat bottom frame 50, the star clip 80 translates within the slot 48.

This temporary pivotal connection permits the seat back 22 to be temporarily connected to the seat bottom 24 in an orientation that is outside a range of tilt and recline of the seat back 22 relative to the seat bottom 24. Additionally, the temporary pivotal connection permits the seat back 22 to be coupled to the corresponding seat bottom 24 while providing a pivotal connection that assists alignment of the receivers 36, 38 with the seat brackets 68, 70.

The invention contemplates that the receivers 36, 38 may be provided on the seat bottom frame 50, while the seat brackets 68, 70 are provided on the seat back frame 26. Likewise, the invention contemplates that the spring clips 42 may be provided on the seat brackets 68, 70 while the apertures 72 are provided on the receivers 36, 38. The invention also contemplates that the slots 48 may be provided in the seat brackets 68, 70, while the apertures 74 and star clips 80 are provided on the receivers 36, 38. Thus, various combinations of seat connections can be employed within the spirit and scope of the present invention.

Figure 9:
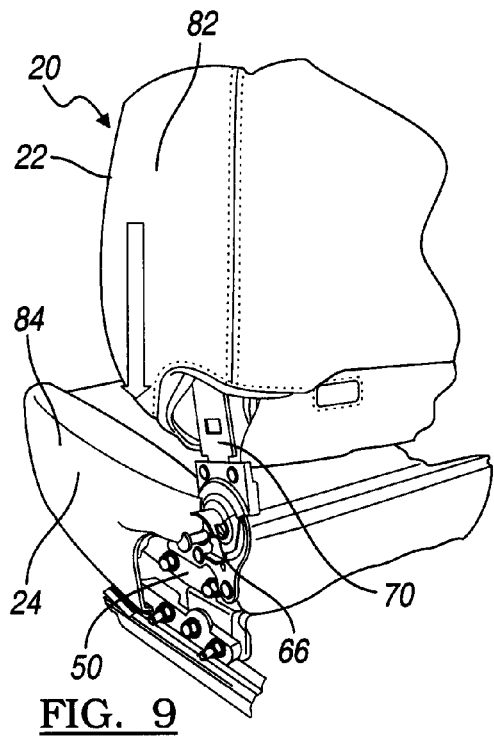
FIG. 9 is a rear perspective view illustrating an assembly step of a vehicle seat back and a vehicle seat bottom in accordance with the present invention.
Figure 10:
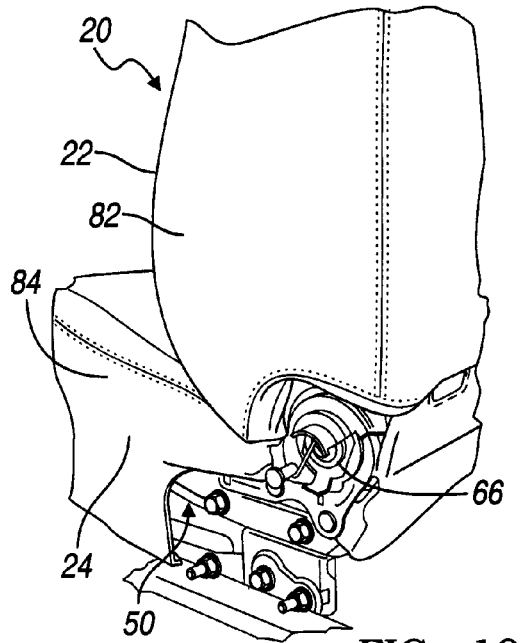
FIG. 10 is a rear perspective view of the assembled vehicle seat of FIG. 9.

The seat connection embodiments of the present invention permit assembly of the seat back 22 to the seat bottom 24 without utilization of additional fasteners. Therefore, as illustrated in FIG. 9, seat back trim 82 can be installed upon the seat back frame 26 prior to assembly of the seat back 22 to the seat bottom 24. The seat back trim 82 may include cushioning, a cover, and other ornamental features, comfort features, or ancillary features. Likewise, seat bottom trim 84 can be installed on the seat bottom frame 50 prior to assembly with the seat back 22. As illustrated in FIG. 9, the completed seat back 22 can be installed upon the completed seat bottom 24 by aligning the receivers 36, 38 (not shown in FIG. 9) with the seat brackets 68, 70 and then sliding the seat back 22 down towards the seat bottom 24 until the spring clips 42 (not shown in FIG. 9) lock into the aperture 72 (not shown in FIG. 9) so that the trimmed vehicle seat 20 is assembled as illustrated in FIG. 10. A hinge cover plate is removed from FIGS. 9 and 10 for illustrating the assembly of the seat back 22 to the seat bottom 24. The hinge cover plate can be added prior to this assembly step such that the last remaining assembly step of the vehicle seat 20 is locking the seat back 22 to the seat bottom 24.

The seat back frame 26 and the seat bottom frame 50 can be trimmed prior to assembly. Thus, the seat back frame 26 and the seat bottom frame 50 may remain disassembled until after the frames 26, 50 are trimmed. This option simplifies the trim operations, thereby reducing costs associated with labor in the trimming operations and shipping to and from the trimming operation because a compact or disassembled vehicle seat 20 may still be available.

Figure 11:
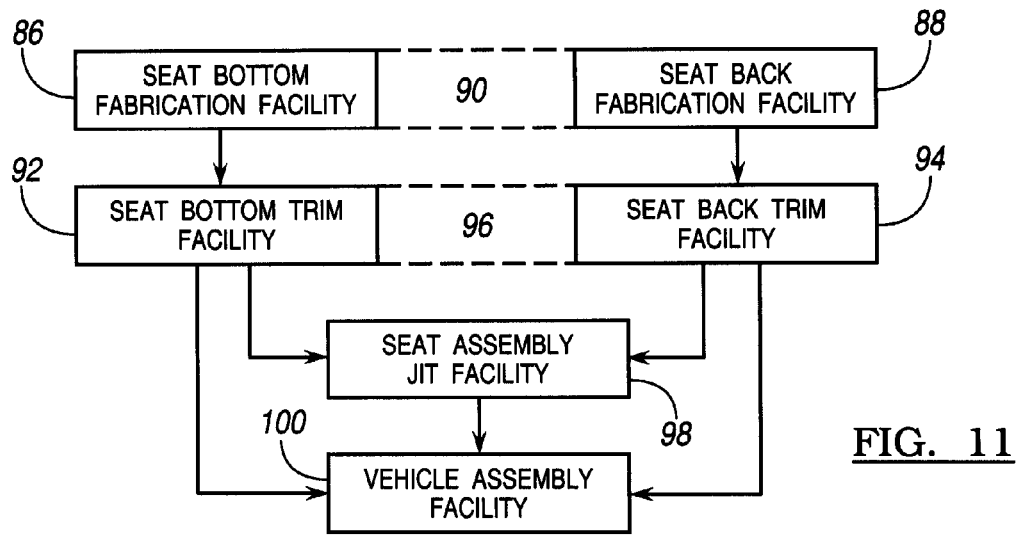
FIG. 11 is a diagram illustrating a manufacturing method in accordance with the present invention.

Referring now to FIG. 11, a method for fabricating a vehicle seat, such as the vehicle seat 20 with a simplified seat connection is diagramed. The seat bottom 24 can be fabricated at a seat bottom fabrication facility 86 that is separate from a seat back fabrication facility 88. Thus, flexibility in fabrication facilities is provided, by permitting the seat bottom 24 and the seat back 22 to be fabricated at separate facilities 86, 88. Of course, the invention contemplates that the seat bottom 24 and the seat back 22 may be fabricated at a common facility 90.

The flexibility of the vehicle seat connection permits the seat bottom 24 and the seat back 22 to be trimmed at separate facilities 92, 94. Thus, if dedicated facilities of each of these operations are cost effective or preferred, the vehicle seat connection provides such flexibility. Of course, the seat bottom can be trimmed at the fabrication facility 86 and the seat back could be trimmed at the fabrication facility 88. Alternatively, the seat bottom 24 and the seat back 22 can be trimmed at a common facility 96.

Once the seat bottom 24 and the seat back 22 are trimmed, the seat back 22 can be temporarily connected to the seat bottom 24 and collapsed or fully assembled prior to shipping. Alternatively, the seat bottom 24 and the seat back 22 can be shipped to an intermediate facility, such as a seat assembly facility 98. The seat back 22 can be temporarily connected to the seat back 24 at the seat assembly facility 98 and then shipped to a vehicle assembly facility 100 for final assembly before or after installation of the vehicle seat 20 within the vehicle. Alternatively, the seat back 22 can be fully assembled with the seat bottom 24 at the seat assembly facility 98 and stored until required for assembly within a vehicle, such as commonly utilized with JIT facilities. Alternatively, the seat bottom 24 and/or the seat back 22 may be shipped directly to the vehicle assembly facility for assembly and installation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
    a seat bottom having a seating surface for supporting an occupant, and a frame with one of a slot and a pivotal connection;
    a seat back having a seating surface for supporting the occupant, and a frame with the other of a slot and a pivotal connection, such that the slot and pivotal connection cooperate to collapse the seat back and seat bottom with the seat back seating surface displaced upon the seat bottom seating surface;
    a receiver mounted to one of the seat bottom and the seat back, the receiver being sized to receive and support an insert, the receiver having a first locking component; and
    an insert mounted to one of the seat bottom and the seat back, the insert having a second locking component;
    wherein the seat back is assembled to the seat bottom by pivoting one of the seat bottom and the seat back about the pivotal connection to align the receiver and the insert, translating one of the seat bottom and the seat back relative to the other along the slot until the insert is inserted into the receiver, and locking the first and second locking components.

2. The vehicle seat of claim 1 wherein the slot is formed in the receiver and the pivotal connection is mounted to the insert.

3. The vehicle seat of claim 1 wherein the receiver is mounted to the seat back and the insert is mounted to the seat bottom.

4. The vehicle seat of claim 1 wherein the receiver further comprises a pair of receivers each mounted to one lateral side of the vehicle seat and the insert further comprises a pair of inserts each mounted to one lateral side of the vehicle seat.

5. The vehicle seat of claim 1 wherein one of the first and second locking components is a spring clip with a leading edge and a retaining edge, and the other of the first and second locking components is an aperture such that as the insert is inserted into the receiver, the leading edge is engaged to retract the spring clip until the retaining edge engages the aperture, thereby locking the seat back to the seat bottom.

6. A method of manufacturing a vehicle seat comprising:
    fabricating a seat bottom with one of an insert and a receiver and with one of a slot and a pivotal connection;
    fabricating a seat back with the other of an insert and a receiver and with the other of a slot and a pivotal connection;
    assembling the pivotal connection into the slot; and
    collapsing the seat back and seat bottom with a seat back seating surface displaced upon a seat bottom seating surface.

7. The method of claim 6 further comprising:
    pivoting one of the seat bottom and the seat back about the pivotal connection to align the receiver and the insert; and
    translating one of the seat bottom and the seat back relative to the other along the slot until the insert is inserted into the receiver.

8. The method of claim 7 further comprising:
    fabricating the seat bottom with a first locking component;
    fabricating the seat back with a second locking component; and
    locking the first and second locking components after the insert is inserted into the receiver.

9. The method of claim 6 further comprising:
    shipping the vehicle seat in the collapsed orientation to a vehicle assembly facility; and
    installing the vehicle seat in a vehicle.

10. The method of claim 9 further comprising:
    pivoting one of the seat bottom and the seat back about the pivotal connection to align the receiver and the insert; and
    translating one of the seat bottom and the seat back relative to the other along the slot until the insert is inserted into the receiver.

11. The method of claim 10 wherein the vehicle seat is installed in the vehicle prior to pivoting one of the seat bottom and the seat back about the pivotal connection.

12. A method of manufacturing a vehicle seat comprising:
    fabricating a seat bottom at a first facility with one of an insert and a receiver;
    fabricating a seat back at a second facility that is different than the first facility with the other of an insert and a receiver;
    shipping the seat bottom to an assembly facility;
    shipping the seat back to the assembly facility; and
    assembling the seat back to the seat bottom by inserting the insert into the receiver.

13. The method of claim 12 further comprising assembling the vehicle seat to a vehicle.

14. The method of claim 12 further comprising assembling the seat bottom to a vehicle before assembling the seat back to the seat bottom.

15. The method of claim 12 wherein the assembly facility is further defined as a vehicle assembly facility.

16. The method of claim 12 wherein the assembly facility is further defined as a seat assembly facility.

17. The method of claim 12 further comprising:
    fabricating a seat bottom frame;
    fabricating a seat back frame;
    installing seat bottom trim on the seat bottom frame, thereby providing the seat bottom;
    installing seat back trim on the seat back frame, thereby providing the seat back; and
    assembling the seat back to the seat bottom after the seat bottom trim is installed on the seat bottom frame and the seat back trim is installed on the seat back frame.

18. The method of claim 12 further comprising:
    shipping the seat bottom to an intermediate facility;
    shipping the seat back to the intermediate facility; and
    shipping the seat bottom and the seat back to a vehicle assembly facility.

19. The method of claim 12 further comprising:
    fabricating the seat bottom with a first locking component;
    fabricating the seat back with a second locking component: and
    locking the seat back to the seat bottom by locking the first and second locking components.

20. The method of claim 19 further comprising assembling the vehicle seat to a vehicle prior to locking the seat back to the seat bottom.

* * * * *